United States Patent
Klann et al.

(10) Patent No.: US 9,085,102 B2
(45) Date of Patent: Jul. 21, 2015

(54) SYSTEM, METHOD AND APPARATUS FOR POLYMER SEALS TO FORM POSITIVE SHUT-OFF FOR INSERT MOLDING OF LIQUID SILICONE RUBBER

(75) Inventors: Charles D. Klann, Lodi, WI (US); Bryan D. Rud, Madison, WI (US); Duan Li Ou, Watchung, NJ (US)

(73) Assignee: SAINT-GOBAIN PERFORMANCE PLASTICS CORPORATION, Aurora, OH (US)

( * ) Notice: Subject to any disclaimer, the term of this patent is extended or adjusted under 35 U.S.C. 154(b) by 1064 days.

(21) Appl. No.: 13/115,722

(22) Filed: May 25, 2011

(65) Prior Publication Data

US 2011/0293925 A1  Dec. 1, 2011

Related U.S. Application Data

(60) Provisional application No. 61/347,871, filed on May 25, 2010.

(51) Int. Cl.
| | | |
|---|---|---|
| B29C 45/14 | (2006.01) | |
| B29C 45/26 | (2006.01) | |
| B29C 33/00 | (2006.01) | |
| B29C 33/38 | (2006.01) | |
| B29C 45/00 | (2006.01) | |

(52) U.S. Cl.
CPC ....... B29C 45/14418 (2013.01); B29C 33/0044 (2013.01); B29C 33/3807 (2013.01); B29C 45/14065 (2013.01); B29C 45/14549 (2013.01); B29C 45/2616 (2013.01); B29C 2045/0034 (2013.01); B29C 2045/14606 (2013.01); Y10T 428/26 (2015.01)

(58) Field of Classification Search
None
See application file for complete search history.

(56) References Cited

U.S. PATENT DOCUMENTS

| | | |
|---|---|---|
| 3,712,575 A | 1/1973 | Bement et al. |
| 3,950,119 A | 4/1976 | Reichenbach |

(Continued)

FOREIGN PATENT DOCUMENTS

| | | |
|---|---|---|
| CN | 1938139 A | 3/2007 |
| JP | S5756128 U | 4/1982 |

(Continued)

OTHER PUBLICATIONS

The Society of Polymer Science, Japan, "Manual of High-polymer Material", Feb. 20, 1973, p. 507 and p. 516, Corona Publishing Co.,Ltd., Japan (English Translation).

(Continued)

*Primary Examiner* — Edmund Lee
(74) *Attorney, Agent, or Firm* — Abel Law Group, LLP; Chi Suk Kim

(57) ABSTRACT

An object is formed on a component with a positive flash shut-off during insert molding operations. The mold has a base with a cavity and a port that delivers a liquid to the cavity. The base has a component support structure for supporting the component and pockets formed on opposite sides of the cavity. The pockets are slightly spaced apart from the cavity by thin partitions. Inserts located in the pockets and are formed from a polymer. Both the partitions and inserts comprise the component support structure. The inserts have a dimension that is smaller than that of the base and partitions so as to form a compression fit around the component to reduce or eliminate flash down the component during the molding process.

10 Claims, 4 Drawing Sheets

(56) References Cited

U.S. PATENT DOCUMENTS

| | | | |
|---|---|---|---|
| 3,972,663 | A | 8/1976 | Taniguchi |
| 4,025,268 | A | 5/1977 | Taylor |
| 4,131,596 | A | 12/1978 | Allen |
| 4,236,689 | A * | 12/1980 | Hass .......................... 249/204 |
| 4,334,849 | A | 6/1982 | Bock |
| 4,466,266 | A | 8/1984 | Gardner et al. |
| 4,479,630 | A | 10/1984 | Wernecke |
| 4,615,857 | A | 10/1986 | Baird |
| 4,671,021 | A | 6/1987 | Takahashi et al. |
| 5,070,039 | A | 12/1991 | Johnson et al. |
| 5,118,271 | A * | 6/1992 | Baird et al. ................. 425/116 |
| 5,395,226 | A * | 3/1995 | Sakai et al. ................. 425/116 |
| 5,454,706 | A * | 10/1995 | Midorikawa et al. ......... 425/116 |
| 5,916,600 | A * | 6/1999 | Dubay et al. ................. 425/116 |
| 6,187,069 | B1 | 2/2001 | Hoshi et al. |
| 6,637,642 | B1 | 10/2003 | Lingnau |
| 6,645,216 | B2 | 11/2003 | Masury et al. |
| 7,168,606 | B2 | 1/2007 | Badrak |
| 7,226,289 | B2 | 6/2007 | Bills et al. |
| 7,431,577 | B2 | 10/2008 | Kondo et al. |
| 7,487,007 | B2 | 2/2009 | MacDonald et al. |
| 8,226,390 | B2 * | 7/2012 | Allen, IV ..................... 425/127 |
| 2003/0005646 | A1 | 1/2003 | McHale, Jr. |
| 2011/0143641 | A1 | 6/2011 | Ramanath et al. |

FOREIGN PATENT DOCUMENTS

| | | |
|---|---|---|
| JP | S6165104 A | 4/1986 |
| JP | 06-238716 A | 8/1994 |
| JP | 07-314459 A | 12/1995 |
| JP | H11277579 A | 10/1999 |
| JP | 2002066928 A | 3/2002 |
| JP | 2008-150218 A | 7/2008 |
| WO | 2011150092 A2 | 12/2011 |

OTHER PUBLICATIONS

Shunsuke Murahashi, Ryohei Oda, and Minoru Imoto, "The Plastic Handbook", Aug. 5, 1970, p. 454-457, p. 459, p. 461-462 and p. 603, Asakura Publishing Co., Ltd., Japan (English Translation).

Fleshless Molding: superior silicone molding results with reduced waste, Dymotek, May 2010, 1 pg, www.dymotec.com/silicone-molding/flashless-molding.php.com.

Seals, gaskets, and o-rings designed and manufactured for the most demanding applications throughout the world, Seals Eastern, Inc., May 2010, 2 pgs., http://sealseastern.com/CompoundSpec.asp?.

Curved Shears Pistol Grip, Harmonic, May 2010, 1 pg, www.harmonic.com/dtcf/components/catalog/deviseGroup/6?pgn=2&sgn=4.

Harmonic Technology, Harmonic, May 2010, 1 pg, www.harmonic.com/dtcf/pages/HarmonicTechnology.htm.

International Search Report for PCT/US2011/037950 dated Feb. 9, 2012 1 pg.

* cited by examiner

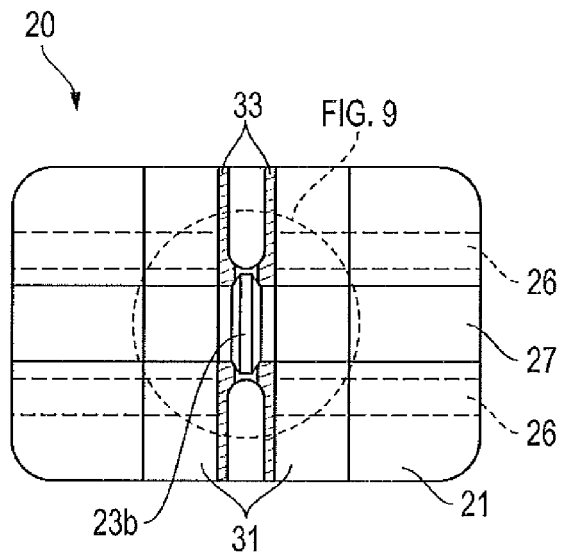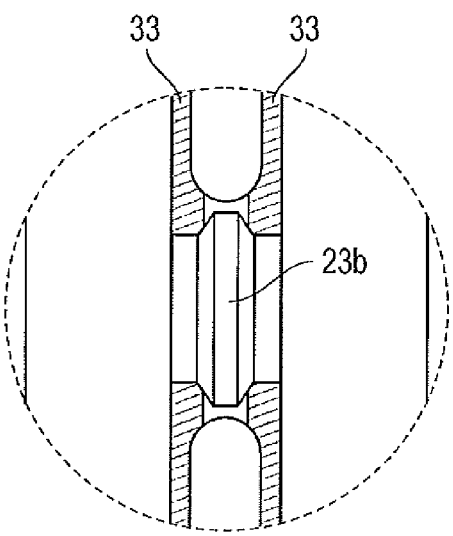
*FIG. 7*
*FIG. 9*
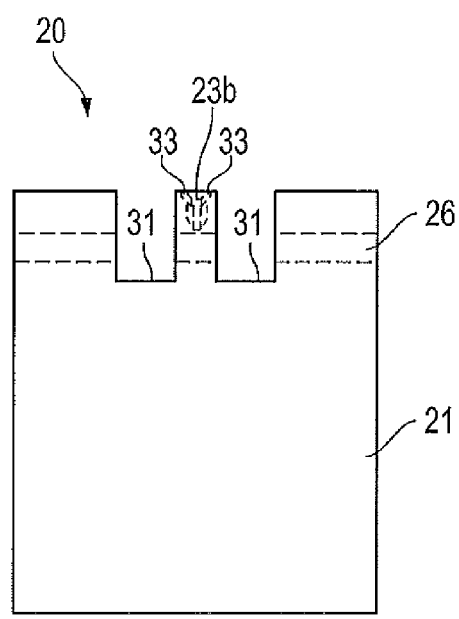
*FIG. 8*

SYSTEM, METHOD AND APPARATUS FOR POLYMER SEALS TO FORM POSITIVE SHUT-OFF FOR INSERT MOLDING OF LIQUID SILICONE RUBBER

This non-provisional application claims priority to and the benefit of U.S. Provisional App. No. 61/347,871, filed May 25, 2010, and is incorporated herein by reference in its entirety.

BACKGROUND

1. Field of the Disclosure

The invention generally relates to insert molding and, in particular, to a system, method and apparatus for forming seals with a positive flash shut-off for the insert molding of liquid silicone rubber are disclosed.

2. Description of Related Art

Curable silicone compositions are used in a variety of applications that range from the automotive industry to medical devices. In many cases, the silicone composition is coupled to a variety of substrates such as polymeric, metallic, or glass substrates. For instance, silicone compositions may be used as a coating or a laminate over a variety of components.

Typically, a component that is overmolded with silicone produces flash, or small, unwanted, excessive fragments of silicone on the molded component. The flash must be removed from the final product, which increases the number of steps in and cost of the manufacturing process. As such, an improved system, method and apparatus for manufacturing silicone-including articles would be desirable.

SUMMARY

Embodiments of a system, method and apparatus for forming an object with a positive flash shut-off for the insert molding of the object on a component are disclosed. For example, a mold for injection molding on the component has a base with a cavity and a port that delivers a liquid to the cavity during the injection molding process. The base has a component support structure for supporting the component and pockets formed on opposite sides of the cavity. The pockets are slightly spaced apart from the cavity by thin partitions.

Embodiments further comprise inserts located in the pockets. The inserts are formed from a polymer, such as a fluoroelastomer or a perfluoroelastomer. Both the partitions and inserts comprise the component support structure. In some embodiments, the inserts have a dimension that is smaller than that of the base and partitions so as to form a compression fit around the component during the molding process. This design reduces or eliminates flash of the mold fluid down the component during the molding process.

The foregoing and other objects and advantages of the embodiments will be apparent to those skilled in the art, in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description briefly summarized above may be had by reference to the embodiments thereof that are illustrated in the appended drawings. However, the drawings illustrate only some embodiments and therefore are not to be considered limiting of its scope as the invention may admit to other equally effective embodiments.

FIG. 7 is a top view of an embodiment of a subassembly for the mold of FIG. 6;

FIGS. 8 and 9 are top and end views, respectively, of an embodiment of an insert for the subassembly of FIG. 7;

The use of the same reference symbols in different drawings indicates similar or identical items.

DETAILED DESCRIPTION

Embodiments of a system, method and apparatus for forming an object with a positive flash shut-off for the insert molding of the object on a component are disclosed. For example, some embodiments form seals with a positive flash shut-off for the insert molding of liquid silicone rubber (LSR) onto the object.

Figure 1:
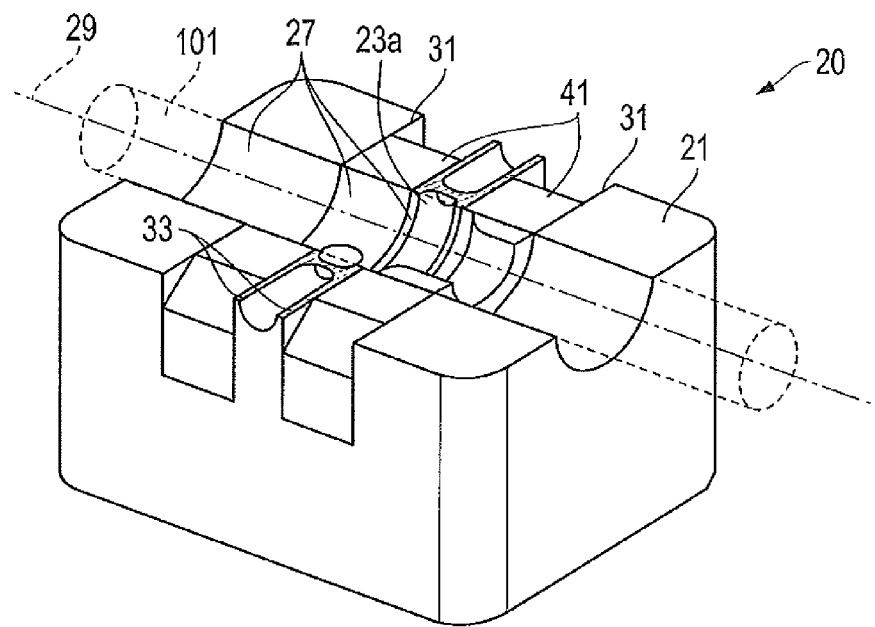
FIG. 1 is a side view of a component having seals formed thereon.
Figure 2:
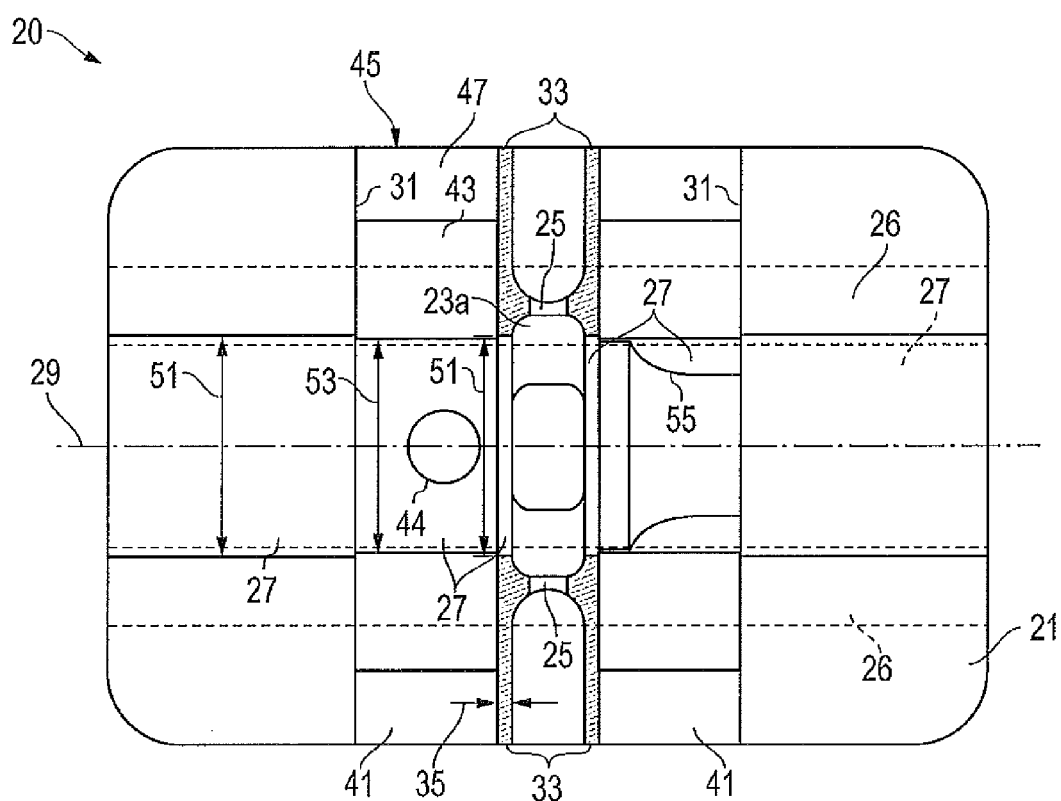
FIG. 2 is an enlarged side view of a portion of the component of FIG. 1.

As shown in FIGS. 1 and 2, embodiments of a mold 20 for injection molding comprise at least one base 21 having a cavity 23 (e.g., cavity 23a or 23b) and at least one port 25 (FIGS. 2, 7 and 8) that delivers a liquid to the cavity 23 during the injection molding process. One type of cavity 23a is shown in FIGS. 1 and 2, and another type of cavity 23b is shown in FIGS. 7-9. As is known to those of ordinary skill in the art, the base 21 may comprise a subcomponent that is mounted in and supported by a larger base foundation (not shown) for compression against another similar base foundation during the molding process. More than one base 21 may be used in such a base foundation. The base is formed from a base material, such as steel.

The base 21 also has a component support structure 27 having an axis 29. In some embodiments, the component support structure 27 coaxially supports a component 101 on which one or more objects 103, 105 (FIGS. 10-14), such as seals, are molded in cavities 23. Embodiments of the base 21 also have a pair of pockets 31 (FIG. 8) formed in the base on opposite axial sides of the cavity 23. The pockets 31 extend in a transverse direction with respect to the axis 29.

The pockets 31 are axially adjacent to the cavity 23 but axially spaced apart from the cavity 23 by respective partitions 33 extending from the base 21. Each partition 33 may comprise an axial thickness 35 (FIG. 2) in a range of 0.002 to 0.050 inches, or approximately 0.010 inches in other embodiments. The partitions 33 may be formed from the base material.

Embodiments further comprise a pair of inserts 41 located in respective ones of the pockets 31. Thus, only the thin partitions 33 separate the inserts 41 from either axial side of the cavity 23. For example, each of the inserts 41 may be formed from a polymer that is softer than the base material. The polymer may be provided with a Shore A durometer hardness in a range of 75 to 100, or about 90 in some embodiments.

The polymer also may have an operating temperature range of 135° C. to 205° C. The polymer may comprise a fluoropolymer having a low surface energy and maintain elasticity at a temperature of up to about 300° C. At elevated temperatures, the low surface energy of the fluoropolymer provides excellent release properties relative to the other material substrate. In some embodiments, the polymer comprises a fluoroelastomer or a perfluoroelastomer, and may comprise at least 60% fluorine, and have a mold release property similar to polytetrafluoroethylene (PTFE). Other embodiments of the polymer as further described herein also may be used.

Both the partitions 33 and the inserts 31 comprise the component support structure 27 as shown. In some embodiments, the component support structure 27 has a cylindrical shape as shown. The base 21 and the partitions 33 have a base diameter 51 (FIG. 2) for the cylindrical shape, and the inserts 41 have an insert diameter 53 for the cylindrical shape. However, the insert diameter 53 is smaller than the base diameter 51.

In addition, some embodiments of the base 21, partitions 33 and the inserts 41 have alignment features such as apertures 26, 28 (e.g., two horizontal apertures 26, and one vertical aperture 28 shown) that are provided for mechanical locating devices, such as pins to ensure alignment between the various parts. In one version, vertical aperture 28 is used to align an alignment pin with the hole 128 (FIG. 11) in the component 101.

Clearances are provided between the alignment pins and apertures to allow movement of the inserts under compression, and the apertures may be provided as through holes. For example, clearances on the order of or less than 0.020 inches may be provided. Slots may be formed as well in order to avoid material from breaking away under compression. Without sufficient clearances, some inserts may swell due to the heat from the mold, and the insert material may be pinched during compression and shear edges where it makes contact with the surrounding steel.

Figure 5:
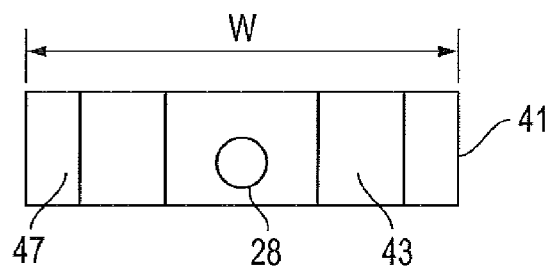
FIG. 5 is a sectional end view of the second portion of FIG. 4, taken along the line 5-5 of FIG. 4.
Figure 6:
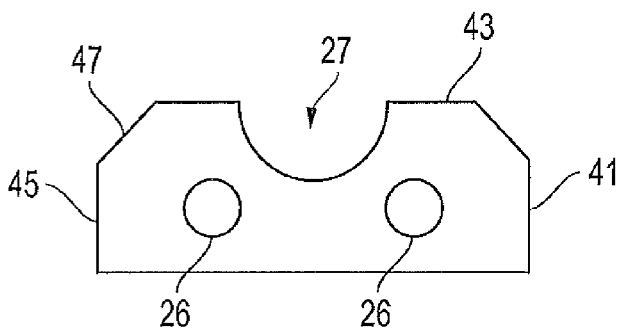
FIG. 6 is an isometric view of an embodiment of a mold for molding the seals.
Figure 10:
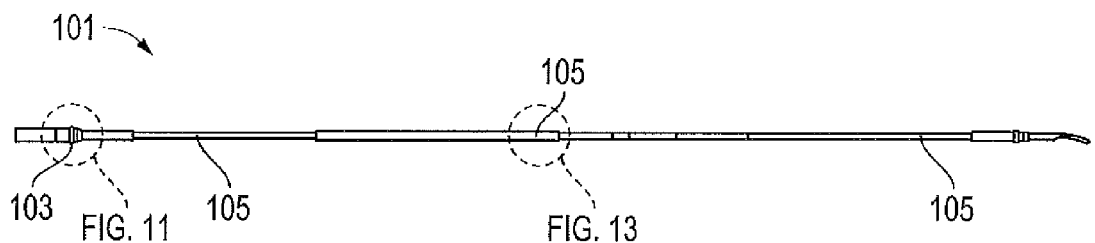
FIGS. 10 and 11 are top and end views, respectively, of another embodiment of an insert.

In FIGS. 1 and 2, the widths of inserts 41 and base 21 are depicted as equal. However, in other embodiments, the inserts 41 have a width W (FIG. 5) that is less than a width of the base 21. A reduced insert width, in some cases equally on each end, allows the insert to move and/or expand during compression.

Figure 3:
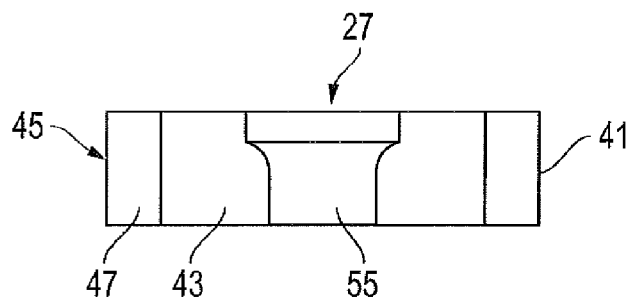
FIG. 3 is a sectional end view of the portion of FIG. 2, taken along the line 3-3 of FIG. 2.
Figure 4:
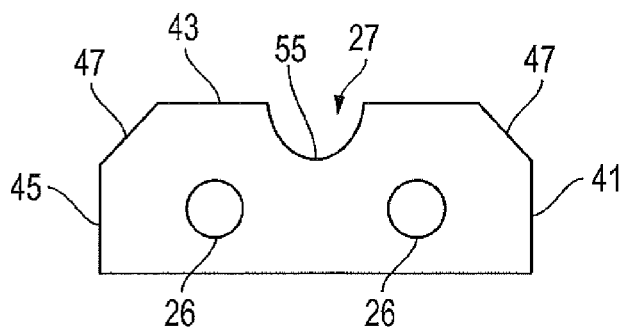
FIG. 4 is an enlarged side view of a second portion of the component of FIG. 1.
Figure 11:
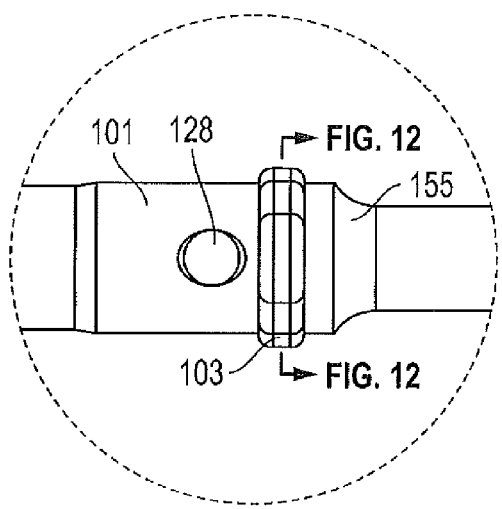
Figure 12:
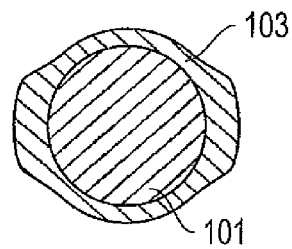
FIGS. 12 and 13 are top and side views, respectively, of another embodiment of a subassembly.
Figure 13:
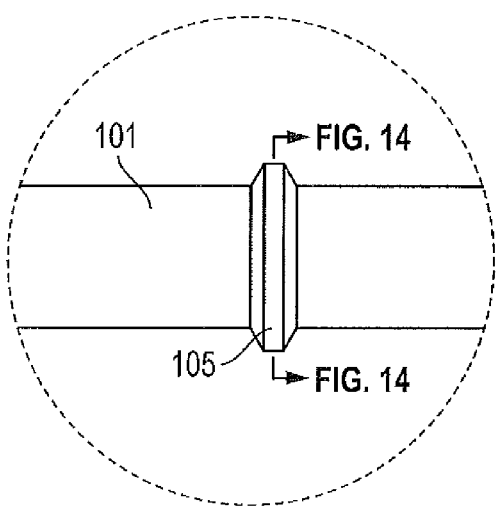
Figure 14:
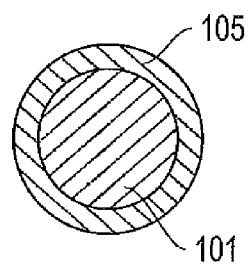
FIG. 14 is an enlarged top view of a LSR mold cavity for the subassembly of FIGS. 12 and 13.

In the embodiment of FIGS. 2-4, the component support structure 27 of at least one of the inserts 41 has a neck 55 that tapers radially along an axial direction of the neck 55 and component 101. The neck 55 that provides a mechanical stop and positioning feature for the component 101. For example, as shown in FIG. 11, the component has a neck 155 that is complementary in shape to neck 55 in the insert 41. In still other embodiments, each of the inserts 41 has a top 43, two sides 45 and a chamfer 47 extending between the top 43 and two sides 45 on opposite sides of the component support structure 27.

Embodiments of a method of overmolding a component 101 comprise providing a pair of bases 21, each having a cavity 23 and a port 25. Pockets 31 are formed in the bases 21 on opposite sides of respective one of the cavities 23. The pockets 31 are adjacent to the cavities 23 but spaced apart from the cavities 23 by respective partitions 33 extending from the bases 21.

The method also comprises installing inserts 41 in respective ones of the pockets 33, with each of the inserts 41 being formed from a polymer that is softer than a base material used to form the bases 21; defining a component support structure 27 in each of the bases 21, partitions 33 and inserts 41 to support the component 101; placing the component 101 on one of the bases 21 such that the component 101 is supported by the component support structure 27 of said one of the bases 21; pressing the other base 21 onto said one of the bases 21 such that the component 101 seats in the component support structure 27 of said other base 21, and the inserts 41 in both bases 21 are compressed, such as in a radial direction with respect to an axis of the component 101. A liquid is delivered to the cavity 23 through the port 25 to form at least one object 103, 105 on the component 101.

In other embodiments, the method comprises forming each partition with a thickness in a range of 0.002 to 0.050 inches, approximately 0.010 inches, and/or forming the partitions from the base material. Other embodiments comprise forming the polymer with a Shore A durometer hardness in a range of 75 to 100, or about 90, and/or an operating temperature in a range of 135° C. to 205° C. The polymer may be formed from a fluoropolymer, a fluoroelastomer or a perfluoroelastomer, or at least 60% fluorine.

In still other embodiments, the method may comprise defining the component support structure as a cylindrical shape, the bases and the partitions have a base diameter for the cylindrical shape, the inserts have an insert diameter for the cylindrical shape, and the insert diameter is smaller than the base diameter; defining the component support structure of at least one of the inserts with a neck that tapers radially along an axial direction of the neck, and the neck provides a mechanical stop and positioning feature for the component; forming each of the inserts with a top, two sides and chamfers extending between the top and two sides on opposite sides of the component support structure; and/or forming the bases, partitions and inserts with alignment features that respectively align with other.

Other Insert Materials

Some embodiments of the inserts may comprise fluoroelastomers from the FKM family of rubbers designed for high temperature operation. Examples include Dai-El, Fluorel, Technoflon and Viton®. They can operate continuously in excess of 200° C. depending on the grade, and intermittently to temperatures on the order of 300° C. They have outstanding resistance to chemical attack by oxidation, acids and fuels, and good oil resistance. However, at high operating temperatures they are relatively weaker, so adequate support against applied forces may be provided. They have limited resistance to steam, hot water, methanol, and other highly polar fluids. They are attacked by amines, strong alkalis and many Freons. There are standard and special grades, and the latter may be designed to have special properties such as improved low-temperature resistance.

Other embodiments of the inserts may comprise perfluoro elastomers in the FFKM family of rubbers. Examples include Chemraz, Kalrez®, Perfluor, Simriz and Zalak. These materials have even greater heat and chemical resistance than the fluoroelastomers. They can be used in extreme conditions up to temperatures around 300° C. or more with special compounding. Their disadvantages are difficult processing, cost, poorer physical properties at high temperature, and their high glass transition temperatures which limit their use at low temperatures. Some materials cannot be used below 0° C., and even at normal ambient temperatures their creep properties may be limited.

Other exemplary fluoropolymers that may be used to form the inserts include a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. Exemplary fluoropolymers layers may be cast, skived, or extruded. In an embodiment, cast and extruded fluoropolymer layers may include multilayered structures such that the composition of the surfaces of the film may or may not match.

Further exemplary fluoropolymers include a polytetrafluoroethylene (PTFE), fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend, mixture, or alloy thereof. In an embodiment, the fluoropolymer layer may include a polytetrafluoroethylene (PTFE), fluorinated ethylene propylene copolymer (FEP), or blends, mixtures, or alloys thereof. In an exemplary embodiment, the fluoropolymer may be a polymer crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers may be obtained from Daikin (Japan) and DuPont (USA). In particular, FEP fluoropolymers are commercially available from Daikin, such as NP-12X.

Liquid Silicone Rubber (LSR) Materials

In an exemplary embodiment, the silicone base polymer may include a non-polar silicone polymer. The silicone base polymer may, for example, include polyalkylsiloxanes, such as silicone polymers formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is a silicone hydride-containing polydimethylsiloxane. In a further embodiment, the polyalkylsiloxane is a vinyl-containing polydimethylsiloxane. In yet another embodiment, the silicone base polymer is a combination of a hydride-containing polydimethylsiloxane and a vinyl-containing polydimethylsiloxane. In an example, the silicone base polymer is non-polar and is free of halide functional groups, such as chlorine and fluorine, and of phenyl functional groups. Alternatively, the silicone base polymer may include halide functional groups or phenyl functional groups. For example, the silicone base polymer may include fluorosilicone or phenylsilicone. Typically, the silicone base polymer is elastomeric. For example, the durometer (Shore A) of the silicone base polymer may be less than about 75, such as about 1 to 70, about 20 to about 50, about 30 to about 50, about 40 to about 50, or about 1 to about 5.

The silicone base polymer may further include a catalyst and other optional additives. Exemplary additives may include, individually or in combination, fillers, inhibitors, colorants, and pigments. In an embodiment, the silicone base polymer is platinum catalyzed. Alternatively, the silicone base polymer may be peroxide catalyzed. In another example, the silicone base polymer may be a combination of platinum catalyzed and peroxide catalyzed. The silicone base polymer may be a room temperature vulcanizable (RTV) formulation or a gel. In an example, the silicone base polymer may be a high consistency gum rubber (HCR) or a liquid silicone rubber (LSR). In an example, the silicone base polymer is an HCR, such as SE6035, SE6075 available from Momentive, MF135 available from Bluestar silicone, and Silastic® Q7-4535, Silastic® Q7-4550 available from Dow Corning.

In a particular embodiment, the silicone base polymer is a platinum catalyzed LSR. In a further embodiment, the silicone base polymer is an LSR formed from a two-part reactive system. The silicone base polymer may be a conventional, commercially prepared silicone base polymer. The commercially prepared silicone base polymer typically includes the non-polar silicone polymer, a catalyst, a filler, and optional additives. Particular embodiments of conventional, commercially prepared LSR include Wacker Elastosil® LR 3003/50 by Wacker Silicone of Adrian, Mich. and Silbione® LSR 4340 by Bluestar Silicones of Ventura, Calif.

In an exemplary embodiment, a commercially prepared silicone base polymer is available as a one-part or two-part reactive system. With a two-part reactive system, part 1 typically includes a vinyl-containing polydialkylsiloxane, a filler, and catalyst. Part 2 typically includes a hydride-containing polydialkylsiloxane and optionally, a vinyl-containing polydialkylsiloxane and other additives. A reaction inhibitor may be included in Part 1 or Part 2. Mixing Part 1 and Part 2 by any suitable mixing method produces the silicone base polymer. With a one-part system or two-part system, the excess hydride-containing siloxane is typically added to the commercially prepared silicone base polymer prior to vulcanization. In an embodiment, the excess hydride-containing siloxane is added to the mixed two-part system or during the process of mixing the two-part system prior to vulcanization. In an exemplary embodiment, the silicone base polymer and the excess hydride-containing siloxane are mixed in a mixing device. In an example, the mixing device is a mixer in an injection molder. In another example, the mixing device is a mixer, such as a dough mixer, Ross mixer, two-roll mill, or Brabender mixer.

Advantages

The embodiments described herein have numerous advantages over prior solutions. The compression of the inserts forms a pre-load and tight seal around the component to form a positive shut-off and prevent excess flash from forming axially down the component during the molding process. The inserts may be installed at the parting lines of the mold to create the positive shut-off and eliminate flash on the component, "as molded" or "as formed". No subsequent flash removal operation is required for the insert molded components. This system is compatible with both hot runner and cold runner mold operations.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of overmolding a component, comprising:
   providing first and second bases and a cavity and a port therewith, the first and second bases also having a component support structure having an axis, the component support structure being adapted to support the component;
   placing the component on the first base such that the component is supported by the component support structure;
   pressing the second base against the first base such that the component seats in the component support structure of the second base, and polymer inserts located adjacent and on opposite axial sides of the cavity in both bases are compressed in a radial direction with respect to an axis of the component when the second base is pressed against the first base; and
   delivering a liquid to the cavity through the port to form an object on the component without forming flash.

2. A method according to claim 1, further comprising:
   forming pockets in the bases on opposite sides of respective one of the cavities, the pockets being adjacent to the cavities but spaced apart from the cavities by respective partitions extending from the bases and formed from a base material;
   installing the polymer inserts in respective ones of the pockets; and
   defining the component support structure in each of the bases, partitions and the polymer inserts to support the component.

3. A method according to claim 2, further comprising forming each partition with a thickness in a range of 0.002 to 0.050 inches.

4. A method according to claim 1, further comprising forming the polymer inserts with a Shore A durometer hardness in a range of 75 to 100.

5. A method according to claim 1, further comprising forming the polymer inserts with an operating temperature in a range of 135° C. to 205° C.

6. A method according to claim 1, further comprising forming each of the polymer inserts with a top, two sides and chamfers extending between the top and two sides on opposite sides of the component support structure.

7. A method of overmolding a component, comprising:
   providing first and second bases and a cavity and a port therewith, the bases having pockets on opposite axial sides of respective one of the cavities, the pockets being adjacent to the cavities but spaced apart from the cavities by respective partitions extending from the bases, inserts located in respective ones of the pockets, each of the inserts being formed from a polymer, and a component support structure in each of the bases, partitions and inserts to support the component;
   placing the component on the first base such that the component is supported by the component support structure;
   pressing the second base onto the first base such that the component seats in the component support structure of the second base, and the inserts in both bases are compressed in a radial direction with respect to an axis of the component when the second base is pressed against the first base; and
   delivering a liquid to the cavity through the port to form an object on the component without forming flash.

8. A method according to claim 7, further comprising forming each partition with a thickness in a range of 0.002 to 0.050 inches.

9. A method according to claim 7, further comprising forming the polymer with a Shore A durometer hardness in a range of 75 to 100.

10. A method according to claim 7, further comprising defining the component support structure as a cylindrical shape, the bases and the partitions have a base diameter for the cylindrical shape, the inserts have an insert diameter for the cylindrical shape, and the insert diameter is smaller than the base diameter.

* * * * *